(12) United States Patent
Lueckenbach et al.

(10) Patent No.: US 8,234,420 B2
(45) Date of Patent: Jul. 31, 2012

(54) METHOD, SYSTEM, AND APPARATUS FOR COMMUNICATING USING MULTIPLE CONTROLLERS

(75) Inventors: William H. Lueckenbach, Hampstead, NC (US); Giovanni Tonno, Florence (IT); Michael Yoensky, Charlottesville, VA (US); Gary Pratt, Hartland, WI (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 92 days.

(21) Appl. No.: 12/836,346

(22) Filed: Jul. 14, 2010

(65) Prior Publication Data

US 2012/0017018 A1  Jan. 19, 2012

(51) Int. Cl.
  *G06F 3/00* (2006.01)
  *G06F 5/00* (2006.01)
  *G06F 13/00* (2006.01)
(52) U.S. Cl. ............... 710/48; 710/260; 714/34
(58) Field of Classification Search .......... 710/48, 710/260; 714/34
See application file for complete search history.

(56) References Cited

U.S. PATENT DOCUMENTS

| | | | |
|---|---|---|---|
| 5,781,741 A * | 7/1998 | Imamura et al. | 709/236 |
| 5,793,963 A | 8/1998 | Tapperson | |
| 6,108,614 A * | 8/2000 | Lincoln et al. | 702/183 |
| 2006/0149875 A1* | 7/2006 | Dong et al. | 710/110 |

OTHER PUBLICATIONS

Profibus Nutzerorganisation e.V.: "Profibus PA technology and application System description", Aug. 31, 2007, pp. 1-26, XP55010043, Karlsruhe Germany Retrieved from the Internet: URL:http://www.profibus. com/nc/downloads/downloads/profibus-pa-technology-and-applic ation-system-description/download/191/ [retrieved on Oct. 20, 2011] p. 4 pp. 9-11.
PCT Search Report issued in connection with corresponding WO Patent Application No. US2011/041358 filed on Jun. 22, 2011.

* cited by examiner

*Primary Examiner* — Chun-Kuan Lee
*Assistant Examiner* — Farley Abad
(74) *Attorney, Agent, or Firm* — GE Global Patent Operation; Catherine J. Toppin

(57) ABSTRACT

Operating a control system includes repeatedly transmitting a first interrupt to at least one interface unit by a first controller of a plurality of controllers, wherein the first interrupt is transmitted at a first frequency. A first response is received at the first controller from the at least one interface unit responsive to the first interrupt, and a second response is received at a second controller of the plurality of controllers from the at least one interface unit, wherein the second response is aperiodic with respect to the first frequency.

18 Claims, 3 Drawing Sheets

METHOD, SYSTEM, AND APPARATUS FOR COMMUNICATING USING MULTIPLE CONTROLLERS

BACKGROUND OF THE INVENTION

The embodiments described herein relate generally to a data exchange system and, more particularly, to a system for exchanging data between system components using a communication network.

At least some known control systems require a short control period for some parameters, but allow for a longer control period for other parameters. Accordingly, at least some known control systems use separate input/output (I/O) networks to enable communication between system components using different control periods. Other known control systems partition a single system into two separately operated systems and then duplicate I/O exchanges between the two systems using a specially designed communication protocol or architecture. However, implementation costs and/or service requirements for such systems rapidly increase due to duplication of system components such as sensors, actuators, and the like. Moreover, using a specially designed communication protocol or architecture often requires additional equipment and/or software implementation costs.

BRIEF DESCRIPTION OF THE INVENTION

In one aspect, a method is provided for operating a control system that includes a plurality of controllers and at least one interface unit coupled to the plurality of controllers via a network. The method includes repeatedly transmitting a first interrupt to the at least one interface unit by a first controller of the plurality of controllers, wherein the first interrupt is transmitted at a first frequency. The method also includes receiving a first response at the first controller from the at least one interface unit responsive to the first interrupt, and receiving a second response at a second controller of the plurality of controllers from the at least one interface unit, wherein the second response is aperiodic with respect to the first frequency.

In another aspect, a system includes at least one interface unit comprising at least one input/output (I/O) module, a first controller coupled to the interface unit via a network, and a second controller coupled to the interface unit via the network. The first controller is configured to repeatedly transmit a first interrupt to the interface unit at a first frequency and receive a first response from the interface unit responsive to the first interrupt. The second controller is configured to receive a second response from the interface unit, wherein the second response is aperiodic with respect to the first frequency.

In another aspect, an interface unit is provided for use with a control system, wherein the interface unit is coupled to a first controller and to a second controller via a network. The interface unit includes a processor configured to repeatedly receive a first interrupt from the first controller at a first frequency, transmit a first response to the first controller responsive to the first interrupt, and transmit a second response to the second controller, wherein the second response is aperiodic with respect to the first frequency.

BRIEF DESCRIPTION OF THE DRAWINGS

The embodiments described herein may be better understood by referring to the following description in conjunction with the accompanying drawings.

DETAILED DESCRIPTION OF THE INVENTION

Exemplary embodiments of methods, systems, and apparatus for use in exchanging input data and output data via a network are described herein. The embodiments described herein enable one or more networks to be used for reliable and high-performance exchange of input data and output data between a controller and one or more remote input/output (I/O) racks that include an interface unit and one or more I/O modules. Moreover, the embodiments described herein enable use of two or more control systems that each has different performance requirements. For example, a first control system, such as a gas compressor control system, may require a much smaller control period or response period than a second control system, such as a ventilation control system. Accordingly, the embodiments described herein enable use of a single I/O network to reduce the need for duplicate sensors, actuators, I/O modules, and/or communication modules.

Figure 1:
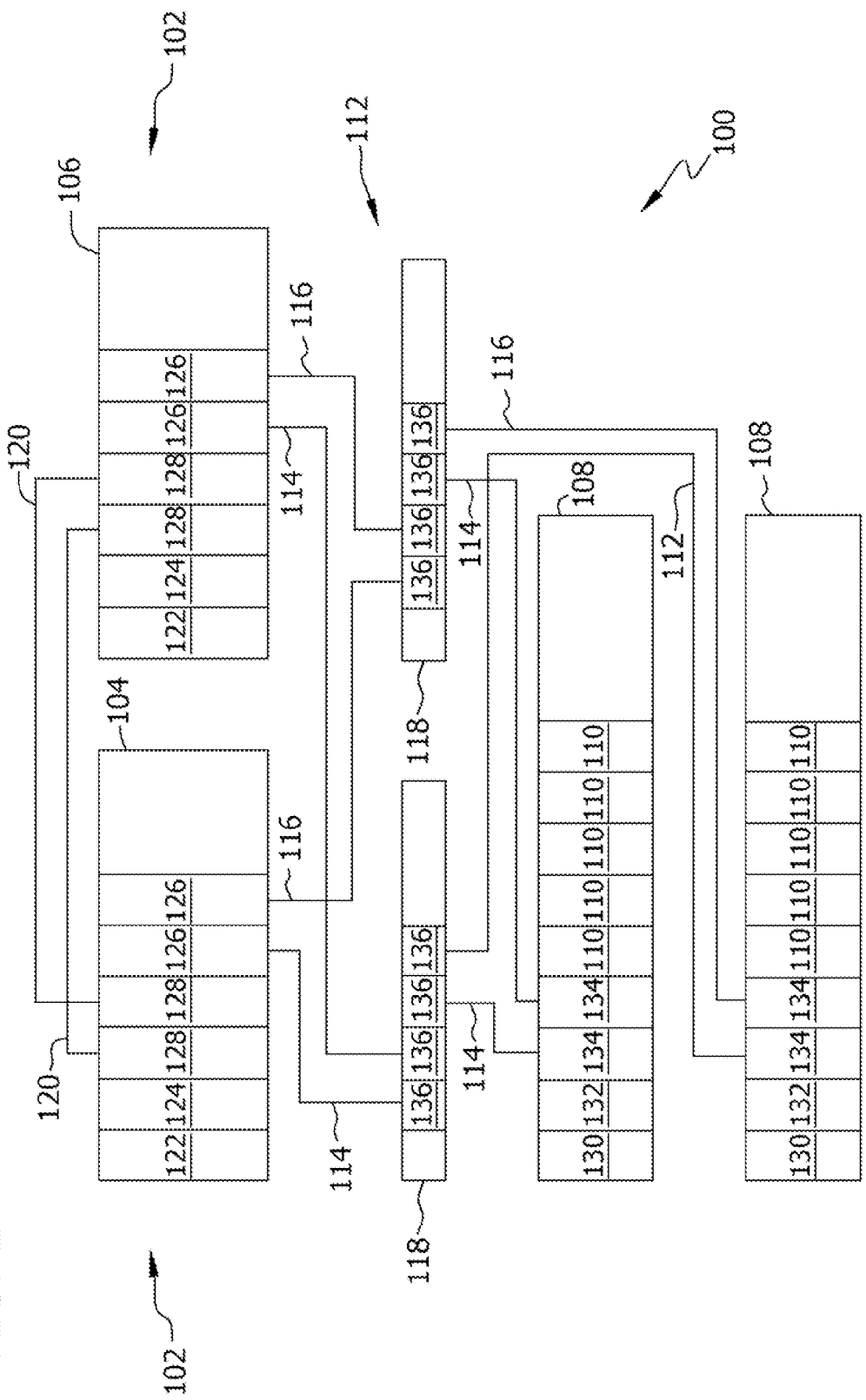
FIG. 1 is a schematic block diagram of an exemplary redundant network system.

FIG. 1 is a schematic block diagram of an exemplary redundant network system 100 that may be used in, for example, an automation system or an industrial communication system to facilitate high-speed data exchanges within system 100. In the exemplary embodiment, system 100 includes a plurality of controllers 102, including at least a first controller 104 and a second controller 106. Moreover, system 100 includes a plurality of interface units 108 and a plurality of I/O modules 110. In some embodiments, controllers 102 are arranged in redundant pairs with one controller 102 designated as a primary controller that controls system operation, and another controller 102 designated as a secondary or backup controller that assumes control of system 100 upon a switchover. Moreover, interface units 108 may operate alone or may operate in redundant pairs or triple arrangements. I/O modules 110 may be discrete modules, analog modules, or a mixture of discrete modules and analog modules.

Each interface unit 108 is coupled to each controller 102 via an I/O network 112. More specifically, system 100 includes a plurality of I/O networks 112, such as a first I/O network 114 and a second I/O network 116, to provide redundant communication channels between interface units 108 and controllers 102. In the exemplary embodiment, each I/O network 112 includes one or more hubs 118 that facilitate routing communication packets, including data, commands, interrupts, and the like, between controllers 102 and interface units 108. In addition, each controller 102 is coupled to each remaining controller 102 via a controller network 120. More specifically, system 100 includes a plurality of controller networks 120 to provide redundant communication channels between controllers 102. In addition, controller networks 120 may be arranged in any suitable topology including, but not limited to, a star network, a ring network, or a point-to-point network. In the exemplary embodiment. I/O networks 112 and controller networks 116 are reflective memory networks. A reflective memory network enables networked systems, such as controllers 102 and interface units 108, to share data.

For example, in the exemplary embodiment, I/O networks 112 and/or controller networks 120 are fiber optic reflective memory networks that operate at approximately 2.12 Gigabaud, and allow, for example, 256 control or computer platforms to share memory with each other. In some embodiments, the control or computer platforms are capable of sharing between 16 megabytes (MB) and 256 MB of control data. Moreover, I/O networks 112 and/or controller networks 120 use either multi-mode or single-mode transceivers to enable communication over distances up to approximately 10 kilometers. Reflective memory networks also enable a high network data throughput rate, such as between 43 million and 174 million bytes transferred per second. Moreover, low level network packet control with reflective memory networks use, for example, 4-byte packets up to 64-byte packets to automatically enhance network throughput. Accordingly, reflective memory networks, such as I/O networks 112 and/or controller networks 120 provide high performance control data transfer and determinism. It will be understood that the above-described shared memory sizes, distances, and/or network capacities are exemplary only and are not intended to limit the embodiments disclosed herein.

In the exemplary embodiment, each controller 102 includes a processor 122, a memory area 124, an I/O network interface 126, and a controller network interface 128. Memory area 124 includes a shared memory portion (not shown) that is available to other controllers 102 via controller networks 120. In one embodiment, each controller 102 is capable of reading and writing to the shared memory portion. In an alternative embodiment, each controller 102 is capable of only reading some of the shared memory portion, but is capable of reading and writing to the rest of the shared memory portion. In the exemplary embodiment, each controller 102 includes an I/O network interface 126 that is dedicated to each instance of I/O networks 112, and a controller network interface 128 that is dedicated to each instance of controller networks 120. In an alternative embodiment, each controller 102 includes multiple processors 122. Moreover, memory area 124 may be embodied as any suitable memory device or application including, but not limited to, a database, a hard disk device, a solid state device, or any other device suitable for storing data as described herein. Furthermore, in the exemplary embodiment, memory area 124 is located within controller 102. Alternatively, memory area 124 may include any memory area internal to, external to, or accessible by controller 102. Further, memory area 124 or any of the data stored thereon may be associated with any server or other computer, local or remote from controller 102 (e.g., accessible via I/O networks 112 and/or controller networks 120).

In the exemplary embodiment, each interface unit 108 includes a processor 130, a memory area 132, and an I/O network interface 134 that facilitates communication with each controller 102 via I/O networks 112. More specifically, in the exemplary embodiment, interface unit 108 includes an I/O network interface 134 that is dedicated to each instance of I/O networks 112. In an alternative embodiment, each interface unit 108 includes multiple processors 130. Moreover, memory area 132 may be embodied as any suitable memory device or application including, but not limited to, a database, a hard disk device, a solid state device, or any other device suitable for storing data as described herein. Furthermore, in the exemplary embodiment, each hub 118 includes a dedicated I/O network interface 136 for each connection to I/O networks 112.

Figure 2:
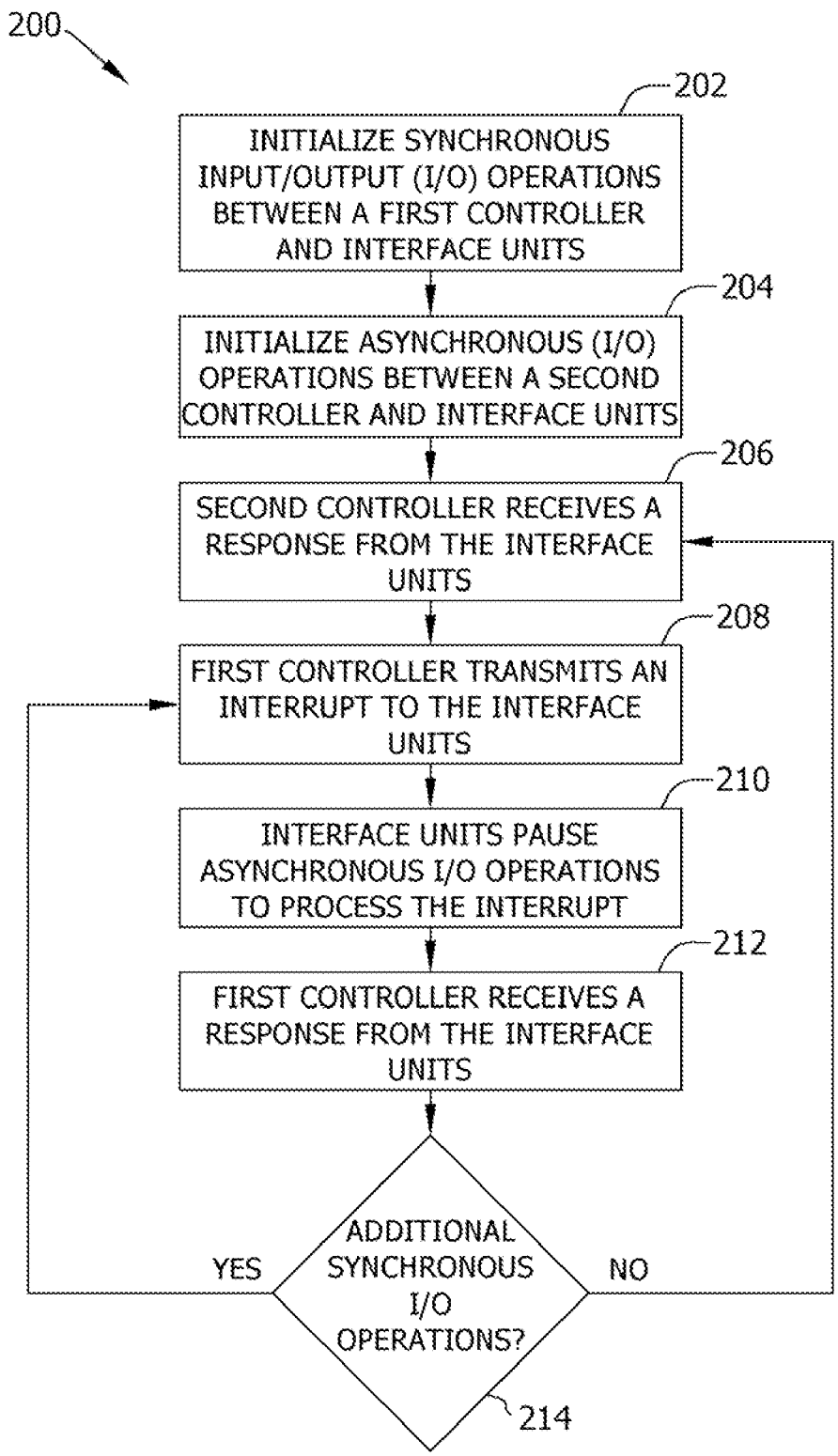
FIG. 2 is a flowchart that illustrates an exemplary method of operating the redundant network system shown in FIG. 1.

FIG. 2 is a flowchart 200 that illustrates an exemplary method of operating system 100 (shown in FIG. 1). In the exemplary embodiment, first controller 104 (shown in FIG. 1) initializes 202 synchronous I/O operations with interface units 108 (shown in FIG. 1) via I/O networks 112 (shown in FIG. 1), such as via first I/O network 114 (shown in FIG. 1).

In addition, and in the exemplary embodiment, second controller 106 (shown in FIG. 1) initializes 204 asynchronous I/O operations with interface units 108 via I/O networks 112, such as via second I/O network 116 (shown in FIG. 1). Initialization of the asynchronous I/O operations enables second controller 106 to receive 206 responses from interface units 108 via I/O networks 112. Such responses may include input data acquired by interface units 108 from I/O modules 110 (shown in FIG. 1). The asynchronous I/O operations also include output data that is transmitted by second controller 106 to one or more interface units 108 for storage on I/O modules 110.

In the exemplary embodiment, first controller 104 initiates a synchronous I/O operation by transmitting 208 an interrupt to one or more interface units 108. In one embodiment, first controller 104 repeatedly transmits 208, such as periodically transmits, the interrupt at a first frequency. Moreover, the interrupt includes a data collection command or a data storage command. In response to the interrupt, interface units 108 pause 210 processing and/or communications related to the asynchronous I/O operations in order to process the interrupt. For example, interface unit 108 processes the data collection command to acquire input data from I/O modules 110, or processes the data storage command to store output data to I/O modules 110. Synchronously transmitting the interrupt to interface units 108 ensures that the interrupt is received and processed by interface units 108 substantially simultaneously. In response to the interrupt, interface units 108 transmit a response to first controller 104 via I/O networks 112. Accordingly, first controller 104 receives 212 the responses from interface units 108. In one embodiment, first controller 104 waits for a specified time period before scanning 110 networks 112 for the response from interface units 108, to enable each interface unit 108 to complete processing of the interrupt and to place the responses on I/O networks 112. If first controller 104 determines 214 that additional synchronous I/O operations are necessary, first controller 104 repeats transmission 208 of an interrupt. If there are not additional synchronous I/O operations, interface units 108 resume processing of the asynchronous I/O operations. In the exemplary embodiment, the responses received by second controller 106 are aperiodic to the interrupts transmitted by first controller 104. For example, first controller 104 transmits interrupts at the first frequency and receives responses from interface units 108 at the first frequency. In the exemplary embodiment, however, second controller 106 does not receive responses from interface units 108 at the first frequency but, rather, receives responses at a different frequency or without regard to a regular frequency.

In an alternative embodiment, both first controller 104 and second controller 106 use synchronous I/O operations to exchange data with interface units 108. In one such embodiment, first controller 104 transmits first interrupts to interface units 108 and second controller 106 transmits second interrupts to interface units 108, both at the first frequency. In another such embodiment, first controller 104 transmits first interrupts to interface units 108 at a first frequency and second controller 106 transmits second interrupts to interface units 108 at a second frequency that is different than the first frequency. For example, the second frequency may be a multiple of the first frequency, or vice versa. In these alternative embodiments, each interrupt from first controller 104 and second controller 106 indicates the destination interface units 108 such that non-designated interface units 108 ignore the interrupt. Moreover, each interface unit 108 is programmed to queue interrupts and/or to delay processing of one interrupt until processing of another interrupt is complete. Further, each interface unit 108 is programmed to resolve conflicts between interrupts that are simultaneously received or nearly simultaneously received.

Figure 3:
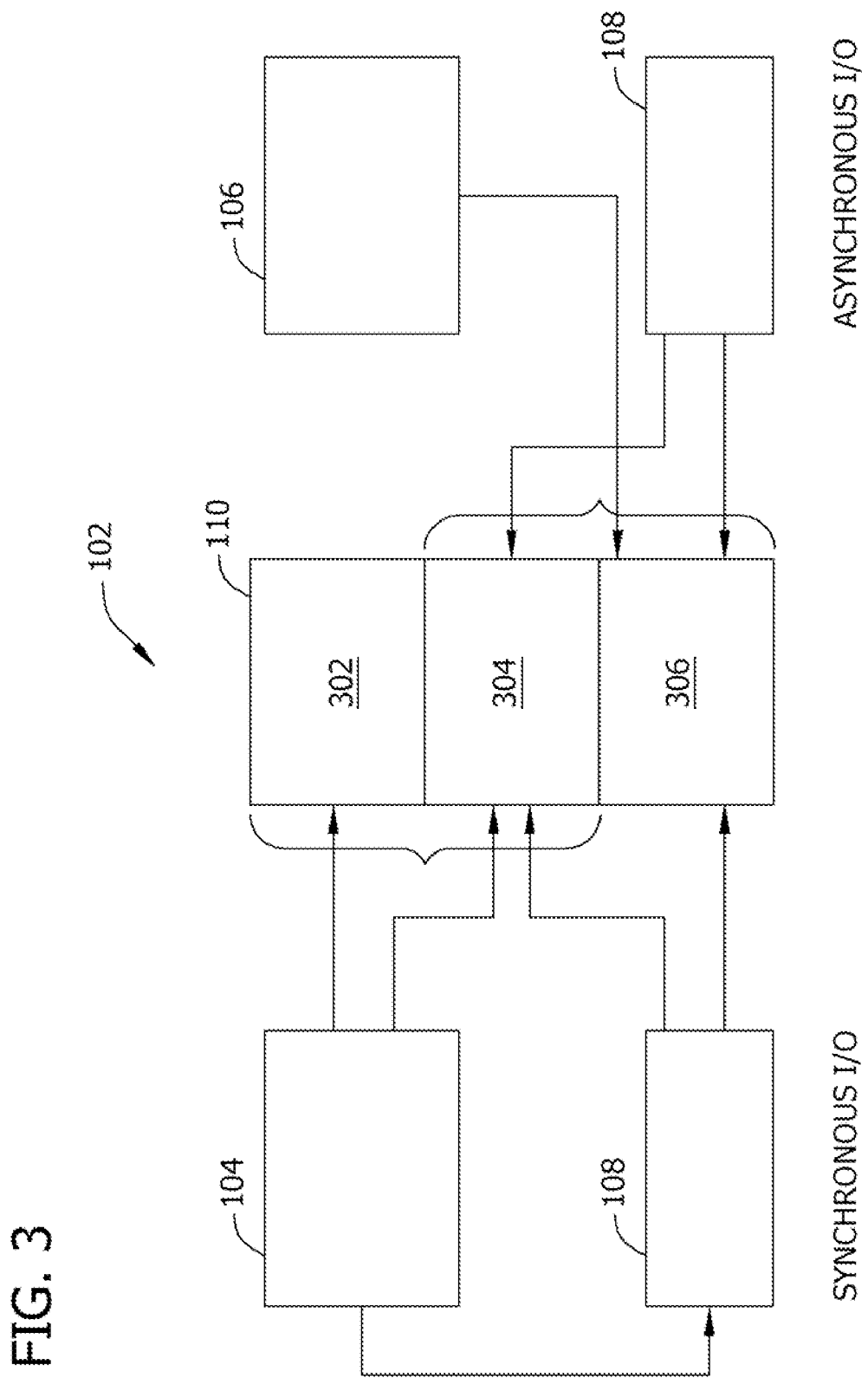
FIG. 3 is a schematic block diagram of a controller memory area that may be used with the redundant network system shown in FIG. 1.

FIG. 3 is a schematic block diagram of memory area 124 of a particular controller 102 that may be used in another alternative embodiment. In such an embodiment, memory area 124 includes a first portion 302, a second portion 304, and a third portion 306. For example, in some embodiments, first portion 302 includes critical data and/or control parameters that are available only to particular interface units 108 and/or particular controllers, such as first controller 104; second portion 304 includes data and/or parameters that are accessible to all interface units 108 and controllers 102; and third portion 306 includes data and/or parameters that are accessible only to particular interface units 108 and/or particular controllers, such as second controller 106. Moreover, in some embodiments, synchronous I/O operations are limited to use of first portion 302 and/or second portion 304, and asynchronous I/O operations are limited to use of second portion 304 and/or third portion 306.

Exemplary embodiments of methods, systems, and apparatus for exchanging input data and output data between a plurality of controllers and one or more interface units via a network are described above in detail. The methods, systems, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller or interface unit, such as those described herein, typically includes at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary control and/or computing system environment, embodiments of the invention are operational with numerous other general purpose or special purpose control and/or computing system environments or configurations. The control and/or computing system environment is not intended to suggest any limitation as to the scope of use or functionality of any aspect of the invention. Moreover, the control and/or computing system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "controller" refers generally to any computer system including programmable automation controllers (PAC), programmable logic controllers (PLC), and any other computer system capable of controlling automation and/or communication functions as described herein. The above examples are exemplary only, and thus are not intended to limit in any way the definition and/or meaning of the term "controller."

In some embodiments, the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a control system that includes a plurality of controllers and at least one interface unit coupled to the plurality of controllers via a single network, said method comprising:
   repeatedly transmitting a first interrupt to the at least one interface unit by a first controller of the plurality of controllers, the first interrupt transmitted at a first frequency;
   receiving a first response at the first controller from the at least one interface unit responsive to the first interrupt;
   repeatedly transmitting a second interrupt to the at least one interface unit by the second controller at the first frequency; and receiving a second response at a second controller of the plurality of controllers from the at least one interface unit, the second response being aperiodic with respect to the first frequency;
wherein the first and second controllers operate simultaneously on the single network.

2. A method in accordance with claim 1, wherein:
transmitting a first interrupt comprises transmitting the first interrupt including a data collection command; and
receiving a first response comprises receiving input data at the first controller from the at least one interface unit responsive to execution of the data collection command by the at least one interface unit.

3. A method in accordance with claim 1, wherein transmitting a first interrupt comprises transmitting the first interrupt including a data storage command.

4. A method in accordance with claim 1, wherein receiving a first response comprises receiving the first response at the first controller at the first frequency.

5. A method in accordance with claim 1, further comprising pausing communication of the second response over the network from the at least one interface unit to enable processing of the first interrupt by the at least one interface unit.

6. A method in accordance with claim 1, wherein the second response from the at least one interface unit is responsive to the second interrupt.

7. A method in accordance with claim 6, wherein transmitting a second interrupt comprises repeatedly transmitting the second interrupt at a second frequency that is different than the first frequency.

8. A method in accordance with claim 1, wherein the first controller includes a first shared memory and the second controller includes a second shared memory, said method further comprising accessing, by the first controller, a first portion of the first shared memory that is unavailable to the second controller.

9. A system comprising:
at least one interface unit comprising at least one input/output (I/O) module;
a first controller coupled to said at least one interface unit via a network, said first controller configured to:
repeatedly transmit a first interrupt to said at least one interface unit, the first interrupt transmitted at a first frequency; and
receive a first response from said at least one interface unit responsive to the first interrupt;
a second controller coupled to said at least one interface unit via said network, said second controller configured to:
repeatedly transmit a second interrupt to the at least one interface unit at the first frequency; and
receive a second response from said at least one interface unit, the second response being aperiodic with respect to the first frequency;
wherein the first and second controllers operate simultaneously on the single network.

10. A system in accordance with claim 9, wherein said second controller is further configured to pause communication of the second response over said network from said at least one interface unit to enable processing of the first interrupt by said at least one interface unit.

11. A system in accordance with claim 9, wherein the second response from said at least one interface unit is responsive to the second interrupt.

12. A system in accordance with claim 11, wherein said second controller is configured to repeatedly transmit the second interrupt at a second frequency that is different than the first frequency.

13. A system in accordance with claim 9, wherein said first controller comprises a first shared memory comprising a first portion that is unavailable to said second controller.

14. An interface unit for use with a control system, said interface unit coupled to a first controller and to a second controller via a single network, said interface unit comprising:
a processor configured to:
repeatedly receive a first interrupt from the first controller, the first interrupt received at a first frequency;
transmit a first response to the first controller responsive to the first interrupt;
repeatedly receive a second interrupt from the second controller at the first frequency;
transmit a second response to the second controller, the second response being aperiodic with respect to the first frequency; and
wherein the first and second controllers operate simultaneously on the single network.

15. An interface unit in accordance with claim 14, wherein said processor is further configured to pause transmission of the second response upon receiving the first interrupt.

16. An interface unit in accordance with claim 14, wherein said processor is further configured to:
transmit the second response to the second controller responsive to the second interrupt.

17. An interface unit in accordance with claim 16, wherein at least one of the first interrupt and the second interrupt includes a data collection command, said processor further configured to:
execute the data collection command by acquiring input data from at least one input/output (I/O) module; and
transmit at least one of the first response and the second response including the input data.

18. An interface unit in accordance with claim 16, wherein at least one of the first interrupt and the second interrupt includes a data storage command, said processor further configured to execute the data storage command by storing output data to at least one input/output module.

* * * * *